2,771,491

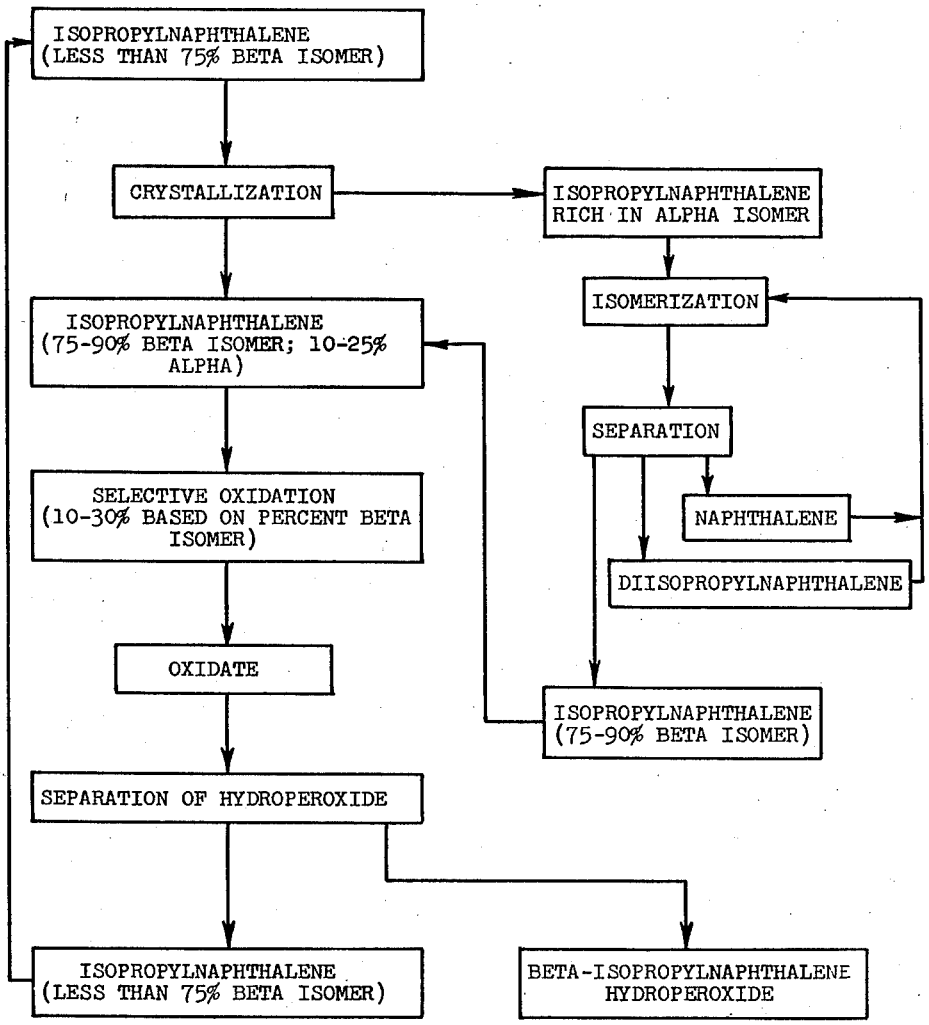

SELECTIVE OXIDATION OF β-ISOPROPYLNAPHTHALENE TO β-ISOPROPYLNAPHTHALENE HYDROPEROXIDE

Joshua C. Conner, Jr., Wilmington, Del., assignor to Hercules Powder Company, Wilmington, Del., a corporation of Delaware Application September 21, 1953, Serial No. 381,488

5 Claims. (Cl. 260—610)

This invention relates to the oxidation of β-isopropylnaphthalene and more particularly to the selective oxidation of β-isopropylnaphthalene in the presence of α-isopropylnaphthalene.

β-isopropylnaphthalene hydroperoxide is readily obtained by oxidation of pure β-isopropylnaphthalene. However, pure β-isopropylnaphthalene is not readily available and it is obtained only by tedious purification processes. Heretofore, it has been thought that while oxidation of β-isopropylnaphthalene is not impaired by the presence of α-isopropylnaphthalene, the hydroperoxide of α-isopropylnaphthalene is also produced in such oxidation, and it has been considered necessary to oxidize β-isopropylnaphthalene of a purity of at least 95% when pure β-isopropylnaphthalene hydroperoxide was desired.

Now in accordance with the present invention, it has been found that a mixture of α- and β-isopropylnaphthalene can be oxidized to produce β-isopropylnaphthalene hydroperoxide substantially free of α-isopropylnaphthalene hydroperoxide and that an improved process results from contacting a mixture of α- and β-isopropylnaphthalene containing at least about 75% β-isopropylnaphthalene with elementary oxygen under hydroperoxide-forming conditions until a hydroperoxide content is attained in the range of 10–30% and determined by the equation:

$$X = 4/3(Y-75) + 10$$

where $X$ = percent conversion and $Y$ = the percent β-isopropylnaphthalene in the isopropylnaphthalene mixture, recovering unreacted isopropylnaphthalene impoverished in β-isopropylnaphthalene from the oxidation reaction and cooling to a temperature in the range of −70 to 10° C. such that crystals form, separating crystalline isopropylnaphthalene containing at least about 75% β-isopropylnaphthalene and recycling to the oxidation.

β-isopropylnaphthalene hydroperoxide is a valuable material for use as a polymerization catalyst and as a raw material for conversion into β-naphthol by acid catalyzed cleavage of the hydroperoxide. When β-isopropylnaphthalene hydroperoxide is the desired end product, it is removed from the oxidation mixture so as to permit recovery of the unreacted isopropylnaphthalene by distillation with or without steam, by extraction with caustic, or by extraction with selective solvents.

When the β-isopropylnaphthalene hydroperoxide is not the desired end product, the β-isopropylnaphthalene hydroperoxide is separated as above, or the oxidation mixture is subjected to chemical reactions for conversion of the β-isopropylnaphthalene hydroperoxide into other products from which the unreacted isopropylnaphthalene can be removed. For instance, when the β-isopropylnaphthalene hydroperoxide is converted into β-naphthol by subjecting the oxidation mixture to cleavage by heating with a catalytic amount of mineral acid, the β-naphthol is recovered by distilling off the unreacted isopropylnaphthalene or by extracting β-naphthol from the isopropylnaphthalene by caustic. Similarly, the unreacted isopropylnaphthalene can be recovered by first reducing the β-isopropylnaphthalene hydroperoxide to the corresponding alcohol and the isopropylnaphthalene can be recovered from this secondary reaction mixture for crystallization to a mixture of α- and β-isopropylnaphthalene containing at least about 75% β-isopropylnaphthalene for use in the oxidation step.

The mother liquor from the crystallization process will be a mixture of α- and β-isopropylnaphthalene impoverished in β-isopropylnaphthalene. When this mixture becomes too impoverished in β-isopropylnaphthalene to yield satisfactory crystals of β-isopropylnaphthalene, the mother liquor is subjected to an isomerization treatment by contacting the isopropylnaphthalene mixture impoverished in β-isopropylnaphthalene with 0.5 to 5 mole percent of aluminum chloride at a temperature in the range of about 55 to 150° C. until the isomerization mixture contains at least about 75% β-isopropylnaphthalene with respect to the total isopropylnaphthalene in the reaction mixture followed by recovering the mixture of α- and β-isopropylnaphthalene containing at least about 75% β-isopropylnaphthalene in the usual manner well known in alkylation art.

The process of this invention is included in the drawing which sets forth a flow diagram of the over-all process.

The step of isomerizing the isopropylnaphthalene crystallization mother liquor is preferably added to the process when other uses of the isopropylnaphthalene enriched in α-isopropylnaphthalene are not available. However, the isopropylnaphthalene mother liquor may also be used as a source of α-isopropylnaphthalene for chemical reactions.

The oxidation process is carried out under atmospheric or elevated pressure at temperatures between about 20 and 150° C., preferably between about 80 and 135° C. The higher the temperature within the range indicated the more rapid will be the oxidation. The selectivity of the oxidation of β-isopropylnaphthalene is less at elevated temperatures and it is, therefore, desirable to use the temperatures in the upper range only when the β-isopropylnaphthalene content is high. The oxidation is preferably effected in the presence of an alkaline substance such as an alkali metal carbonate, an alkali metal hydroxide, or an alkaline earth metal hydroxide such as sodium or potassium carbonate or hydroxide or calcium hydroxide. If desired, the alkali may be added gradually during the course of the oxidation reaction so as to maintain alkalinity in the system without the use of an excess of alkali at any stage during the oxidation. The alkali used in the system is preferably aqueous so as to introduce small amounts of water into the system. Water may also be introduced in the form of steam. The rate of absorption of oxygen by the reaction mixture remains fairly high from the commencement of the reaction until a hydroperoxide content in the range of about 30% is attained. The rate of absorption does not appear to vary greatly with the amount of β-isopropylnaphthalene in the system within the range of 75 to about 90% β-isopropylnaphthalene content. The oxidation of β-isopropylnaphthalene appears to be highly selective as long as the β-isopropylnaphthalene content remains above about 75% of the isopropylnaphthalene isomers in the oxidation system. However, this selectivity is not as great as the oxidation progresses as it is in the initial stages. Consequently, it is necessary to carry the reaction out to a lower hydroperoxide content when the amount of α-isopropylnaphthalene in the system is fairly high. It has been found, for instance, that when the β-isopropylnaphthalene content is about 75%, the amount of conversion to hydroperoxide should not exceed about 10% of the mixture and that when the β-isopropylnaphthalene content is about 90%, the conversion should not be carried beyond about 30% hydroperoxide in the oxidation system. The following equation has been found to satisfactorily express the percent conversion with varying contents of β-isopropylnaphthalene:

$$X = 4/3(Y-75) + 10$$

where X=percent conversion and Y=percent β-isopropylnaphthalene in the isopropylnaphthalene mixture. The process is particularly well adapted to the oxidation of β-isopropylnaphthalene in a mixture of isopropylnaphthalene isomers in which the β-isopropylnaphthalene content is in the range of 75–90%.

The elementary oxygen used in the oxidation process may be in the form of air or of mixtures of oxygen with other inert gases or vapors wherein the oxygen content is richer than in air or it may be in the form of pure oxygen. When the oxygen is diluted it may be diluted with nitrogen, carbon dioxide, steam, or other inert gases.

The oxidation of the isopropylnaphthalene may be carried out in a batch system or in a continuous system and the reaction may be initiated in either instance by the addition of peroxidic compounds which are known to facilitate and accelerate the oxidation reactions.

It is particularly important in the oxidation process that the elementary oxygen-containing gases be added to the liquid reaction mixture in the form of a highly dispersed gas. This is accomplished by means of mechanical dispersing devices and very rapid agitation.

The oxidation process may also be carried out in aqueous emulsion in which suitable dispersing agents such as alkali metal stearates, oleates, or lauryl sulfates or the like are added to the water phase of the system. The water phase may amount to 0.5 to 4 times the volume of the isopropylnaphthalene. The water is preferably maintained alkaline at a pH in the range of about 7.5 to 12.

After the oxidation has been carried out to the desired hydroperoxide content, the β-isopropylnaphthalene hydroperoxide may be separated by extractions with alkali in order to recover the isopropylnapthalene which has become impoverished in β-isopropylnaphthalene as a result of the oxidation or the unreacted isopropylnaphthalene may be separated from the hydroperoxide by distillation, preferably under reduced pressure. The unreacted isopropylnaphthalene may also be recovered after having carried out reactions which destroy the β-isopropylnaphthalene hydroperoxide such as in the conversion to β-naphthol or to α,α-dimethylnaphthyl carbinol as set forth hereinabove.

The isopropylnaphthalene impoverished in β-isopropyl naphthalene recovered from the oxidation reaction is enriched in β-isopropylnaphthalene by crystallization of the β-isopropylnaphthalene in the mixture. The β-isopropylnaphthalene is crystallized from the recovered isopropylnaphthalene containing α-isopropylnaphthalene as the only solvent by cooling to a temperature in the range of −50 to 10° C., or it is crystallized from a solution of β-isopropylnaphthalene dissolved in α-isopropylnaphthalene in admixture with a poor solvent for β-isopropylnaphthalene by cooling the isopropylnaphthalene mixture in the presence of said poor solvent to a temperature in the range of −70 to 10° C., seeding with β-isopropylnaphthalene when necessary.

The β-isopropylnaphthalene is separated from the mother liquor, and the mother liquor, which preferably has been freed of as much β-isopropylnaphthalene as possible by crystallization, is isomerized to a mixture richer in β-isopropylnaphthalene.

The concentration of β-isopropylnaphthalene in the isopropylnaphthalene which is subjected to the crystallization process is preferably greater than 33% of the total isopropylnaphthalene in the mixture. The minimum satisfactory amount of β-isopropylnaphthalene in the isopropylnaphthalene which will permit crystallization of the β-isopropylnaphthalene dissolved therein will vary with the amount and type of solvent used and the temperature of cooling. The isopropylnaphthalene mixture should contain at least 33% β-isopropylnaphthalene for a minimum of crystal formation when a volatile solvent is added to aid in the crystallization, and it should contain at least about 50% β-isopropylnaphthalene when the isopropylnaphthalene mother liquor is the only solvent.

Tabulated below are the concentrations of α-isopropylnaphthalene and β-isopropylnaphthalene in the equilibrium mixture of isopropylnaphthalene and β-isopropylnaphthalene crystals in a slurry of isopropylnaphthalene at the various temperatures that are preferred for use in the absence of addition solvent.

| Temperature, ° C. | Liquid Phase | | Solid Phase | |
|---|---|---|---|---|
| | α, percent | β, percent | α, percent | β, percent |
| +10 | 1 | 99 | --------- | 100 |
| +9 | 6.5 | 91 | Trace | →100 |
| +7 | 17 | 79 | <1 | →100 |
| +1 | 24 | 75 | 2 | 99 |
| −2 | 32 | 65 | 4 | 97 |
| −5 | 37 | 58 | 4 | 98 |
| −11 | 45 | 50 | 6.2 | 93 |

Crystallization may be caried out at lower temperatures, the limiting factor being the viscosity of the slurry. This may be partially overcome by alternately raising and lowering the temperature during the crystallization. The crystals enriched in β-isopropylnaphthalene but not of the desired purity are further crystallized in the usual manner of carrying out fractional crystallization until the desired purity is attained. The mother liquors may be crystallized a second time to obtain a second crop, if desired. The mother liquors are then subjected to the isomerization treatment.

In carrying out the process of this invention, the isopropylnapthalene is oxidized in stages re-using the unreacted isopropylnaphthalene until the β-isopropylnaphthalene content of the unreacted isopropylnaphthalene is so low that it is impractical to continue because of the low conversion required to get selective oxidation, or the recovered isopropylnaphthalene is crystallized before being returned to the system, even though it is still capable of oxidation with a high conversion.

As an example of the former procedure, 75 parts isopropylnaphthalene containing 90% β-isopropylnaphthalene and 25 parts isopropylnaphthalene containing 80% β-isopropylnaphthalene and 10% β-isopropylnaphthalene hydroperoxide are placed along with 50 parts 2% aqueous sodium carbonate solution in a reaction vessel fitted with a reflux condenser, gas inlet tub opening through a fritted glass plate, a thermometer and an efficient high speed agitator. The reaction vessel is heated in a constant temperature bath. While maintaining a temperature of 90° C. and stirring vigorously, air is introduced through the gas inlet tube until an ispropylnaphthalene hydroperoxide content of 30% is reached. This requires about 24 to 30 hours. The reaction mixture is then extracted with 5% sodium hydroxide in 20% ethanol in four portions to remove the β-isopropylnaphthalene hydroperoxide. The recovered isopropylnaphthalene free of ethanol and amounting to about 73.3 parts containing about 86.4% β-isopropylnaphthalene is returned to the oxidation process and oxidized to a content of about 25.2% isopropylnaphthalene hydroperoxide. The above outlined process is repeated following the schedule below until a recovered isopropylnaphthalene containing about 75.7% β-isopropylnaphthalene is attained.

| Oxidation Stage | 1 | 2 | 3 | 4 |
|---|---|---|---|---|
| Parts Isopropylnaphthalene | 100 | 73.3 | 56.8 | 47.0 |
| Percent β-Isopropylnaphthalene | 90 | 86.4 | 82.5 | 78.9 |
| Percent Isopropylnaphthalene Hydroperoxide in Oxidation Product | 30.0 | 25.2 | 20.0 | 15.2 |
| Parts Isopropylnaphthalene Recovered | 73.3 | 56.8 | 47.0 | 40.8 |
| Percent β-Isopropylnaphthalene in Isopropylnaphthalene Recovered | 86.4 | 82.5 | 78.9 | 75.7 |

The recovered isopropylnaphthalene (40.8 parts) is distilled with recovery of 30 parts isopropylnaphthalene and 10.8 parts high boiling residue. The 30 parts isopropylnaphthalene is diluted with 5 parts hexane and is cooled to −20° C. in the presence of β-isopropylnaphthalene seed crystals to obtain about 15 parts crystalline isopropylnaphthalene containing about 85% β-isopropylnaphthalene. On cooling the mother liquor to −20° C. again, a second crop of about 5 parts 78% β-isopropylnaphthalene is obtained. The mother liquor is diluted with an equal volume of hexane and is dried over calcium chloride and is then stirred with 0.4 part anhydrous aluminum chloride at about 70° C. for about one hour to isomerize the α-isopropylnaphthalene into a mixture rich in β-isopropylnaphthalene. The isomerization mixture is recovered by pouring into 5% sodium hydroxide in finely divided ice. The isopropylnaphthalene is recovered from the naphthalene and diisopropylnaphthalene by-products as isopropylnaphthalene of about 90% β-isopropylnaphthalene content which is cycled to the oxidation process. The naphthalene and diisopropylnaphthalene are recycled to the isomerization process.

As an example of the crystallization of each oxidation residue so as to work with isopropylnaphthalene of high β-isopropylnaphthalene content, 100 moles of isopropylnaphthalene rich in α-isopropylnaphthalene is isomerized by heating in an equal volume of hexane with three moles anhydrous aluminum chloride at 70° C. for one-half hour. The isomerizate is poured into ice water and washed with 5% sodium hydroxide and then distilled. About 60 moles naphthalene and 10 moles polyisopropylnaphthalene are recovered and returned to a subsequent isomerization. About 26 moles isopropylnaphthalene containing 90% β-isopropylnaphthalene are oxidized as in the above-outlined procedure at 115° C. until 30% of the isopropylnaphthalene has reacted. The oxidate containing about 27% β-isopropylnaphthalene hydroperoxide is then added to a cleavage vessel while adding gradually 0.4% of its weight 95% sulfuric acid and then heating to 70° C. with stirring for 20 minutes. The resulting cleavage mixture is mixed with just sufficient 10% sodium hydroxide to neutralize the sulfuric acid and the acetone obtained in the cleavage is distilled off. The β-naphthol obtained in the cleavage reaction is then extracted with 5% sodium hydroxide and is recovered by acidification of the alkali extract. The alkali-insoluble portion from the cleavage mixture is 22.4 moles isopropylnaphthalene containing about 84% β-isopropylnaphthalene. This is cooled to −5° C. to separate 15.3 moles crystalline isopropylnaphthalene containing 96% β-isopropylnaphthalene which is recycled to the oxidation step and a mother liquor amounting to 7.1 moles isopropylnaphthalene containing 58% β-isopropylnaphthalene which is distilled and recycled to the isomerization step where it is treated with 0.2 to 5 mole per cent aluminum chloride at 55 to 150° C. to isomerize to a mixture containing about 85% β-isopropylnaphthalene.

Crystallization of β-isopropylnaphthalene may be accomplished by use of a solvent, if desired.

Isopropylnaphthalene containing 85% β-isopropylnaphthalene dissolved in an equal volume of ethanol and crystallized at −10° C. yields β-isopropylnaphthalene crystals containing only a trace of α-isopropylnaphthalene. After recrystallization six times from ethanol, it is completely free of α-isopropylnaphthalene. The crystalline β-isopropylnaphthalene is obtained in two different forms, one melting at 10.5° C. to 11° C. and the other melting at 14° C. to 14.5 C. Both on fusion have the same physical constants: $N_D^{20}$ 1.5866, $d_{20}^{20}$ 0.9772, boiling point 268±.5° C. (760 mm.).

Using alcohol as a solvent, crystallization is generally carried out at 9 to −12° C. However, temperatures as low as −50° C. are particularly suitable for the first crystallization, especially with samples of isopropylnaphthalene containing a low content of β-isopropylnaphthalene, for instance, as low as 33%.

While many organic solvents are operable in the crystallization process and almost any volatile organic solvent which is miscible with the isopropylnaphthalene can be used for crystallizing isopropylnaphthalene which is substantially pure β-isopropylnaphthalene, provided small amounts are used, it is preferable to use a solvent which can be used in an amount about equal to the volume of the isopropylnaphthalene. The volatile hydrocarbons boiling below 100° C. are particularly satisfactory and the normally liquid hydrocarbons such as pentanes, hexanes, and heptanes are the best for maintaining satisfactory viscosity at very low temperatures. These hydrocarbons are preferred because they may be left in the mother liquor which is carried over to the isomerization step. Propane and butanes are also excellent for use where equipment for handling these normally gaseous hydrocarbons is available.

Isopropylnaphthalene containing less than 90% β-isopropylnaphthalene is isomerized to isopropylnaphthalene containing about 90% β-isopropylnaphthalene by heating with 0.5 to 5 mole per cent aluminum chloride at a temperature in the range of 55 to 150° C. Isopropylnaphthalene containing 37% β-isopropylnaphthalene, for instance, is converted to a mixture containing β-isopropylnaphthalene in an amount about 90% of the isopropylnaphthalene fraction by heating the isopropylnaphthalene at about 100° C. with about 0.5 mole percent anhydrous aluminum chloride. A small amount of naphthalene and diisopropylnaphthalene are formed at the same time in the isomerization process. The crude isomerized isopropylnaphthalene when subjected to crystallization conditions set forth above yields crystals of β-isopropylnaphthalene which may be removed and the resulting mother liquor may again be subjected to the isomerization process to again increase the β-isopropylnaphthalene content. Fresh isopropylnaphthalene may be added to the cycle to replace the β-isopropylnaphthalene crystallized out.

The isomerization process is carried out on isopropylnaphthalene mother liquors in the following manner:

To a reactor fitted with a stirrer, thermometer, and means for heating and cooling is added a predetermined amount of isopropylnaphthalene containing about 40% β-isopropylnaphthalene along with about five times its weight of hexane, and a weighed amount of anhydrous aluminum chloride powder corresponding to 2 mole percent of the isopropylnaphthalene. This mixture is stirred at room temperature to disperse the catalyst. An orange solution results. The temperature is raised to reaction temperature and the reaction mixture is heated until the analysis shows isomerization is essentially complete. The mixture is then worked up by pouring into water containing sufficient NaOH to dissolve the aluminum hydroxide resulting from hydrolysis of the aluminum chloride. The product is dried and distilled to separate the monoisopropylnaphthalene from naphthalene and diisopropylnaphthalene and other by-products. The monoisopropylnaphthalene fraction is analyzed by ultraviolet absorption. Naphthalene even in amounts as low as 5% interferes with the U. V. analysis in indicating a lower yield of β-isopropylnaphthalene than actual and, therefore, must be removed before analysis.

Results are shown for typical examples in the table.

| Run | Isopropyl-naphthalene Moles | Isopropyl-naphthalene Percent β | AlCl³ Moles | Temp., °C. | Isomerized Isopropyl-naphthalene Composition (percent) α | Isomerized Isopropyl-naphthalene Composition (percent) β |
|---|---|---|---|---|---|---|
| 1 | 1 | 20 | .05 | 55  | 8.6  | 90.9 |
| 2 | 1 | 50 | .01 | 70  | 12.2 | 87.2 |
| 3 | 1 | 42 | .01 | 100 | 3.9  | 95.4 |
| 4 | 1 | 57 | .008| 100 | 10.2 | 89.6 |
| 5 | 1 | 63 | .02 | 100 | 13.5 | 88.1 |
| 6 | 1 | 75 | .02 | 100 | 11.5 | 88.9 |
| 7 | 1 | 10 | .02 | 100 | 14.2 | 86.8 |
| 8 | 1 | 48 | .05 | 100 | 3.2  | 95.7 |
| 9 | 1 | 30 | .05 | 100 | 2.7  | 96.5 |

The isomerized mother liquor of isopropylnaphthalene contains 72.4 mole percent naphthalene, 21.2 mole percent isopropylnaphthalene, and 5.3 mole percent diisopropylnaphthalene. The isopropylnaphthalene fraction is separated by distillation from the naphthalene and higher boiling materials before subjecting the isopropylnaphthalene fraction to crystallization. The naphthalene and materials boiling higher than the isopropylnaphthalene fraction are recycled to the isomerization reaction along with the isopropylnaphthalene mother liquors from which the β-isopropylnaphthalene was crystallized.

The amount of aluminum chloride catalyst for the isomerization step of the present invention is from about 0.5 to about 5 mole percent based on the naphthalene ring compounds in the system. With amounts of catalyst approaching 5 mole percent, caution and care with respect to time and temperature are required to avoid condensation of naphthalene compounds with themselves with the formation of tar.

The temperature range within which the isomerization is established is 55 to 150° C. The preferred temperature range is about 100° C.

The time required for establishment of equilibrium depends on the temperature and the amount of catalyst. Using a maximum amount of catalyst of 5 mole percent based on the naphthalene products in the system, the time for establishment of equilibrium will vary from about 60 to less than one minute over the temperature range from 55 to 150° C. The time required at about 100° C. using 5 mole percent catalyst is about 30 minutes. To avoid side reactions, the contact time should not exceed about two time the time required for equilibrium to be established.

The isomerization reaction is preferably carried out using a nonaromatic saturated hydrocarbon solvent to act as a diluent for the reaction. Examples of such solvents are the paraffinic hydrocarbons, both low boiling and high boiling up to a boiling point not exceeding about 150° C. Examples are propane, butane, pentanes, hexanes, heptanes, and octanes or mixtures. The solvent is used in liquid phase and under pressure, if necessary, and at a temperature below the critical temperature of the solvent. Paraffinic hydrocarbons boiling in the range of the hexanes and heptanes are preferred solvents. The amount of solvent may be any amount up to about 10 times the weight of the naphthalene, but about one to about five times the weight of the naphthalene is preferred.

What I claim and desire to protect by Letters Patent is:

1. The process which comprises contacting a mixture of α- and β-isopropylnaphthalene containing 75% to 90% β-isopropylnaphthalene with elementary oxygen under hydroperoxide-forming conditions until a hydroperoxide content is attained in the range of 10–30% and determined by the equation $$X = 4/3(Y-75) + 10$$

where $X$ = percent conversion and $Y$ is the percent β-isopropylnaphthalene in the mixture, whereby the β-isopropylnaphthalene is selectively oxidized to β-isopropylnaphthalene hydroperoxide, recovering unreacted isopropylnaphthalene impoverished in β-isopropylnaphthalene from the oxidation reaction and cooling to a temperature in the range of −70 to 10° C. such that crystals form, separating crystalline isopropylnaphthalene containing at least about 75% β-isopropylnaphthalene and recycling to the oxidation reaction.

2. The process which comprises contacting a mixture of α- and β-isopropylnaphthalene containing 75% to 90% β-isopropylnaphthalene with elementary oxygen under hydroperoxide-forming conditions until a hydroperoxide content is attained in the range of 10–30% and determined by the equation $$X = 4/3(Y-75) + 10$$

where $X$ = percent conversion and $Y$ is the percent β-isopropylnaphthalene in the mixture, whereby the β-isopropylnaphthalene is selectively oxidized to β-isopropylnaphthalene hydroperoxide, recovering by distilling unreacted isopropylnaphthalene impoverished in β-isopropylnaphthalene from the oxidation reaction and cooling to a temperature in the range of −70 to 10° C. such that crystals form, separating crystalline isopropylnaphthalene containing at least about 75% β-isopropylnaphthalene and recycling to the oxidation reaction.

3. The process which comprises contacting a mixture of α- and β-isopropylnaphthalene containing 75% to 90% β-isopropylnaphthalene with elementary oxygen under hydroperoxide-forming conditions until a hydroperoxide content is attained in the range of 10–30% and determined by the equation $$X = 4/3(Y-75) + 10$$

where $X$ = percent conversion and $Y$ is the percent β-isopropylnaphthalene in the mixture, whereby the β-isopropylnaphthalene is selectively oxidized to β-isopropylnaphthalene hydroperoxide, recovering unreacted isopropylnaphthalene impoverished in β-isopropylnaphthalene from the oxidation reaction by extracting β-isopropylnaphthalene hydroperoxide with aqueous alkali therefrom and cooling the recovered isopropylnaphthalene to a temperature in the range of −70 to 10° C. such that crystals form, separating crystalline isopropylnaphthalene containing at least about 75% β-isopropylnaphthalene and recycling to the oxidation reaction.

4. The process which comprises contacting a mixture of α- and β-isopropylnaphthalene containing 75% to 90% β-isopropylnaphthalene with elementary oxygen under hydroperoxide-forming conditions until a hydroperoxide content is attained in the range of 10–30% and determined by the equation $$X = 4/3(Y-75) + 10$$

where $X$ = percent conversion and $Y$ is the percent β-isopropylnaphthalene in the mixture, whereby the β-isopropylnaphthalene is selectively oxidized to β-isopropylnaphthalene hydroperoxide, recovering unreacted isopropylnaphthalene impoverished in β-isopropylnaphthalene from the oxidation reaction by heating the reaction mixture with an acid-acting catalyst to cleave the β-isopropylnaphthalene hydroperoxide to β-naphthol and subsequently separating the β-naphthol and cooling the recovered isopropylnaphthalene to a temperature in the range of −70 to 10° C. such that crystals form, separating crystalline isopropylnaphthalene containing at least about 75% β-isopropylnaphthalene and recycling to the oxidation reaction.

5. The process which comprises contacting a mixture of α- and β-isopropylnaphthalene containing 75% to 90% β-isopropylnaphthalene with elementary oxygen under hydroperoxide-forming conditions until a hydroperoxide content is attained in the range of 10–30% and determined by the equation $$X = 4/3(Y-75)+10$$

where X=percent conversion and Y is the percent β-isopropylnaphthalene in the mixture, whereby the β-isopropylnaphthalene is selectively oxidized to β-isopropylnaphthalene hydroperoxide, recovering unreacted isopropylnaphthalene impoverished in β-isopropylnaphthalene from the oxidation reaction and cooling to a temperature in the range of −70 to 10° C. such that crystals form, separating crystalline isopropylnaphthalene containing at least about 75% β-isopropylnaphthalene and recycling to the oxidation reaction, isomerizing the isopropylnaphthalene mother liquor from the crystallization process by contacting the isopropylnaphthalene mother liquor with 0.5 to 5 mole percent of aluminum chloride at a temperature in the range of 55 to 150° C. until the isomerization reaction mixture contains at least 75% β-isopropylnaphthalene with respect to the total isopropylnaphthalene in the reaction mixture, and recycling said isomerized isopropylnaphthalene to the oxidation step.

References Cited in the file of this patent

UNITED STATES PATENTS 2,515,237　　Kutz ------------------- July 18, 1950

FOREIGN PATENTS 654,035　　Great Britain ---------- May 30, 1951